(12) United States Patent
Gilbert

(10) Patent No.: US 9,620,065 B2
(45) Date of Patent: Apr. 11, 2017

(54) DISPLAY DEVICE INCLUDING A MULTIFUNCTIONAL AND COMMUNICATING SURFACE

(71) Applicant: SUNPARTNER TECHNOLOGIES, Château de Galice (FR)

(72) Inventor: Joël Gilbert, Eguilles (FR)

(73) Assignee: SUNPARTNER TECHNOLOGIES, Rousset (FR)

( * ) Notice: Subject to any disclaimer, the term of this patent is extended or adjusted under 35 U.S.C. 154(b) by 28 days.

(21) Appl. No.: 14/350,828

(22) PCT Filed: Oct. 10, 2012

(86) PCT No.: PCT/FR2012/000409
§ 371 (c)(1),
(2) Date: Apr. 10, 2014

(87) PCT Pub. No.: WO2013/054010
PCT Pub. Date: Apr. 18, 2013

(65) Prior Publication Data
US 2014/0253613 A1    Sep. 11, 2014

(30) Foreign Application Priority Data
Oct. 11, 2011 (FR) ..................................... 11 03098

(51) Int. Cl.
*G09G 3/34* (2006.01)
*G02F 1/1333* (2006.01)
(Continued)

(52) U.S. Cl.
CPC ....... *G09G 3/3406* (2013.01); *G02F 1/13338* (2013.01); *G02F 1/133526* (2013.01); *G06F 3/0412* (2013.01); *G09G 2360/147* (2013.01)

(58) Field of Classification Search
CPC ..... G06F 3/0412; G06F 3/0416; G06F 3/0488
See application file for complete search history.

(56) References Cited

U.S. PATENT DOCUMENTS

2005/0122465 A1   6/2005  Togashi
2006/0125977 A1   6/2006  Park et al.
(Continued)

FOREIGN PATENT DOCUMENTS

FR         2 890 181 A1    3/2007
WO    WO 2011/004841 A1    1/2011

OTHER PUBLICATIONS

International Search Report (PCT/ISA/210) mailed on Jan. 31, 2013, by the European Patent Office as the International Searching Authority for International Application No. PCT/FR2012/000409.

*Primary Examiner* — Ricardo L Osorio
(74) *Attorney, Agent, or Firm* — Buchanan Ingersoll & Rooney PC

(57) ABSTRACT

The invention relates to a display device including a plurality of pixels forming an image, and an optical plate arranged opposite the image and having transparency areas configured to allow the light from the pixels to at least partially pass therethrough. The optical plate further includes at least one array of functional elements corresponding to an electronic and/or mechanical function. The functional elements are inserted between the transparency areas and arranged such that the light emitted by the pixels is directed so as to pass through the transparency areas without intercepting the arrays of functional elements, so as to render the arrays of functional elements invisible or quasi-invisible to an observer of the display device. The invention can be used in any type of display device in which functions other than display itself must be integrated in a visually discreet manner.

24 Claims, 3 Drawing Sheets

(51) Int. Cl.
G02F 1/1335 (2006.01)
G06F 3/041 (2006.01)

(56) References Cited

U.S. PATENT DOCUMENTS

| | | | |
|---|---|---|---|
| 2007/0070264 A1* | 3/2007 | Fujita | G02F 1/13318 349/61 |
| 2008/0317303 A1* | 12/2008 | Konno | G06K 9/2027 382/124 |
| 2011/0050648 A1* | 3/2011 | Lee | G06F 3/042 345/175 |
| 2012/0133618 A1 | 5/2012 | Usukura et al. | |
| 2012/0212499 A1* | 8/2012 | Haddick | G02B 27/0093 345/589 |
| 2013/0170013 A1* | 7/2013 | Tonar | G02F 1/157 359/296 |

\* cited by examiner

DISPLAY DEVICE INCLUDING A MULTIFUNCTIONAL AND COMMUNICATING SURFACE

The present invention relates to display devices and, more particularly, to interactive images and to display screens such as those of cell phones, computers, GPS location devices, communication tablets, electronic newspapers, urban advertising, without this list being limiting.

STATE OF THE ART

The communication between, for example, a device provided with a display screen and a user can traditionally take place via an interface of the type comprising a manual keyboard, electronic mouse, joysticks, touch medium, microphone, physical or chemical sensor, including communication by radio waves or by infrared.

However, more and more frequently, from the point of view of the usage made by the user, the aim is to optimize the size of the screen of a device, notably with respect to cell phones, while minimizing the size and the visual impact of the components providing functions other than the display function.

This trend has been particularly notable in recent years in the field of mobile telephony, the keypads of a large number of high-end cell phones, called "smart phones", having been purely and simply replaced by touch screens incorporating the traditional keyboard function in the screen itself.

This integration of the keyboard function in the screen of a cell phone or similar, raises a first series of problems when it is done according to techniques most widely used to produce touch screens.

In practice, the integration of touch sensors on the surface of an image and, more specifically, on the surface of a display screen, requires, in the current state of the art, these sensors to be transparent such that the quality of the image is degraded little or not at all. Such transparent touch sensors are thus commonly incorporated in the surface of the display screens of computers, telephones, devices provided with the GPS (Global Positioning System) function, or televisions.

These transparent touch sensors can be produced using different technologies, but the active layer of a touch slab is these days more generally produced in TCO (transparent conductive oxide).

Now, the materials of TCO type, although they are transparent and do not therefore interfere with the image displayed on the screen, are not very good conductors of electricity, which hampers the quality of the detection of the contacts on the screen.

Furthermore, the cost of the transparent TCO materials is still high and their future availability at reasonable costs does not appear guaranteed, with risks of scarcity of TCO on the market in the next few years. There would therefore be an interest in finding a replacement solution for the TCO materials in the context of the production of touch screens.

Now, it appears that the cost of integration of the touch function in a screen could be reduced, and the effectiveness of the touch function increased, if the network of TCO material lines could be replaced by lines of a highly conductive metal, since the conductive metal wires obviously do not present any problem of availability. However, there is then an a priori prohibitive technical problem, in that the conductive metal lines are not transparent. Consequently, the network of lines of the touch screen would then be visible in the displayed image, which would obviously be unacceptable.

It can therefore easily be seen that an economical solution likely to use a touch network of non-transparent conductive material would be highly attractive, notably for the manufacturers of touch slabs to be incorporated in the screens, provided that an innovative means can be found for visually masking such a non-transparent touch network, with respect to the observer of the display screen.

Such a masking method would be likely to resolve this first issue of how to produce touch screens provided with a touch network made of metal wire discretely incorporated in the screen.

Obviously, such a method would be interesting not only for cell phones, but also for the production of any other electronic device, mobile or not, provided with a touch screen.

Another complementary issue arises from the relatively large size of the screens in most of the modern portable electronic devices.

In practice, because of the integration of the touch screens in the screens, the front face of the appliances concerned is in most cases totally covered by the screen. This form factor is becoming increasingly important to the point of hampering or conditioning any new hardware integration of an additional function in the appliance.

Now, there is precisely a trend toward the integration of increasingly more functionalities in certain portable appliances provided with a screen. Such is in particular the case, for example, with cell phones and interactive tablets which, in addition to a screen, are increasingly incorporating other innovative hardware technologies combined with new software applications. Some of these technologies require significant integration spaces, which therefore conflict with the space allotted to the screen.

One example that can be cited is the case of the so-called RFID (radiofrequency identification device) technology, which is embodied by an antenna connected to an electronic chip. The antenna consists of turns of a conductive metal, generally 2 to 5 turns which occupy the edges of a rectangle or of a square following the outline of the screen. Now, the mobile communication appliances also already include one or more antennas, and, consequently, the integration of the RFID communication functionality would necessarily raise the question of the space available for an additional antenna.

The same will apply when additional functions, other than the touch function or the RFID communication function, will also have to be incorporated in screens or display devices in which the screen or, more generally, the display device occupies most of the surface.

There will therefore increasingly be a conflict for the allocation of surface area between the display screen proper and other functions, once again, unless an original and novel technical solution likely to facilitate the visually discrete integration of these additional functions in the display surface itself can be found.

Based on the problems of integration of a touch screen or of an RFID communication function in a display screen, it can therefore be seen that there will increasingly be a stumbling block in the form of a new and potentially much more general problem, which is that of the integration in a display device of one or more functions whose hardware components are not transparent and have to be integrated in a visually discrete manner so as not to hamper the visibility of the image itself on the display device.

This issue is not resolved by the techniques currently known. The result of this is that any application or functionality which would require the use of the surface of the screen for the integration of a material that is not transparent to the visible light spectrum would be possible only if a substantial innovation could be proposed making it possible to render the material needed to implement the duly integrated application or functionality almost or totally invisible to the observer.

AIM OF THE INVENTION

In light of the above, the general aim of the invention is to propose a display device that can resolve the problems posed while avoiding the drawbacks linked to the prior art.

Consequently, a main aim of the invention consists in incorporating, in the surface of a device for displaying an image, such as, in particular, an electronic display screen, functional elements that are not transparent but which must remain invisible or at least barely visible to the user, and which therefore degrade the quality of the image displayed on the screen only slightly or not at all.

Another aim of the invention is to propose a display device in which this integration of non-transparent elements is possible with low cost and high reliability.

Another aim of the invention is to propose a display device in which one or more additional functions will be able to be incorporated in the area allotted to the image, these functions being independent or combined with one another. The duly integrated non-transparent elements will, for example, be able to be a touch network of electrical wires, an antenna for emitting and/or receiving electromagnetic waves, a temperature sensor, a sound wave sensor, a sensor of ionizing radiation, a sensor of metallic objects, a magnetic field sensor, a biometric sensor or similar.

SUMMARY OF THE INVENTION

The principle of the invention is to arrange, above the image itself, consisting of a plurality of pixels, an innovative optical plate incorporating the components needed to produce the function to be incorporated in the screen, for example conductive lines of a touch network or the turns of an antenna.

In order to render these components, which are typically non-transparent, almost or totally invisible to an observer watching the image, this optical plate is essentially constructed by stacking a network of optical components, notably lenses, on the one hand, and a network of areas of transparency alternating with non-transparent areas in which functional elements corresponding to the function to be incorporated in the display device are arranged.

More specifically, the subject of the invention is therefore a display device comprising a plurality of pixels forming an image, and an optical plate arranged facing the image and including areas of transparency configured to allow at least part of the light from the pixels to pass, characterized in that:
said optical plate also comprises at least one network of functional elements which are not transparent to the visible light and that correspond to an electronic and/or mechanical function;
and said functional elements are inserted between the areas of transparency and arranged in such a way that the light emitted by the pixels is directed to pass through the areas of transparency without intercepting the networks of functional elements, so as to render said networks of functional elements invisible or quasi-invisible to an observer of the display device, although these functional elements are non-transparent as such.

In as much as the optical geometry is observed, the invention does not imply any particular limit on the nature of the functional elements implemented. Thus, there can be sensor and/or transducer elements, configured to fulfill one or more functions.

Advantageously, the functions implemented can be taken from the following:
the antenna function for emitting and/or receiving electromagnetic waves;
the touch function for detecting contact and positioning of a finger or a stylus on the surface of the optical plate;
the temperature sensor function;
the microphone function;
the electrical energy storage battery function;
the metallic object detection function;
the ionizing radiation detection function;
the biometric information detection function;
the magnetic field detection function;
the optical sensor function suitable for redirecting the light to photovoltaic elements for the generation of a photovoltaic electrical current.

According to an advantageous variant of the invention, the network of functional elements is configured in such a way that the light emitted by the pixels is directed and focused by the lens- or prism-based optical components. In practice, in this way, the light from the pixels passes mostly into the areas of transparency of the optical plate, without illuminating the functional elements which, because of this, remain practically invisible to the observer.

According to the invention, each network of functional elements corresponds to an electronic and/or mechanical function, which has the advantage of making a number of electronic and/or mechanical functions coexist in an almost invisible manner in one and the same display device, in addition to the components necessary to the display itself.

Obviously, the thickness of the network of functional elements depends on the geometry and the thickness of the host display device. It is perfectly possible to obtain integrations of functional elements that are thin, when the latter are produced in the form of a thin electronic and/or mechanical layer.

In the context of the integration of electrically conductive elements for the production of a screen for a cell phone for example, a network of functional elements having a thickness of a few hundred microns is perfectly possible to consider.

According to an advantageous embodiment, the lenses for focusing the light from the pixels are produced in the form of a network of lenses, more particularly in the form of a lenticular film integrated in the optical plate.

According to the chosen embodiment, the lenticular film can be replaced by a film containing prismatic forms, but it will be possible, if necessary, to combine the two.

In a first variant embodiment, the lenticular or prismatic film is positioned between the plane of the pixels and the thin electronic and/or mechanical layer used.

In another variant embodiment, the lenticular or prismatic film is situated directly facing the observer and therefore on top of the networks of areas of transparency and the network of functional elements. The functional film containing the functional elements is therefore in this case positioned between the pixels and the lenticular or prismatic film.

When required by the function to be incorporated in the display device, the functional elements are non-transparent, such as, for example, in the case of the integration in a screen of a touch network consisting of a network of conductive wires.

The areas of transparency are arranged facing the lenses, the latter being positioned between the areas of transparency and the pixels so as to focus the light from one or more pixels toward the areas of transparency and to guide it between the functional elements toward the observer of the display device.

Alternatively, the non-transparent functional elements are spaced apart by areas of transparency arranged facing the lenses, the latter being positioned above said functional elements so as to guide the light from one or more pixels through the areas of transparency and the lenses and to direct it toward the observer of the display device.

In an embodiment of the invention corresponding to the problem of the integration of the contact detection touch function in a screen, the functional elements are contact sensors, consisting in particular of wires that are made of a material that is not transparent to the light and that are electrically conductive.

In this case, the electrically conductive wires are insulated from one another and are arranged as a network whose intersections constitute capacitive or resistive nodes suitable for forming a touch network, such that, when a finger or a stylus approaches a node of the network, its position is identified on the display device.

In an embodiment of the invention corresponding to the problem of the integration of the electromagnetic communication function, notably the RFID function, in a screen, the functional elements are configured in the form of an antenna for emitting and/or receiving electromagnetic waves, and the antenna then operating with frequencies which are those of the radiofrequency identification RFID devices.

As a variant, the functional elements are configured to minimize the impact of the electromagnetic waves emitted by the cell phone on the health of the human brain and/or to induce particular relaxation states. To this end, the functional elements are produced in the form of an antenna for emitting and/or receiving electromagnetic waves operating with electromagnetic frequencies tuned to the operating frequencies of the human brain. This notably makes it possible, in the context of the integration in a cell phone screen, to minimize the impact of the electromagnetic waves on the health of the brain.

The duly produced emitting and/or receiving antenna is either powered by a battery or a photovoltaic cell, or self-powered by the energy of the electromagnetic waves that it receives.

In an embodiment of the invention corresponding to the problem of the integration of the temperature sensor function in a display device, the functional elements are configured in the form of a temperature sensor, and the functional film then comprises thermocouples consisting of at least two electrical conductors of different chemical formulae which form at least two junctions between them.

In an embodiment of the invention corresponding to the problem of the integration of the microphone function in a display device, the functional elements are configured in the form of a microphone, and the functional film then contains functional elements consisting of piezoelectric films, which in this case consist, for example, of lead zirconate titanate (LZT).

In an embodiment of the invention corresponding to the problem of the integration in a display device of the electrical energy storage battery function, the functional film comprises at least three thin layers stacked one on top of the other and respectively having the anode, cathode and solid electrolyte functions, this solid electrolyte preferably containing lithium.

In an embodiment of the invention corresponding to the problem of the integration in a display device of the metallic object detection function, the functional film comprises inductive sensors with eddy currents consisting of a circuit of wires passed through by a sinusoidal voltage.

In an embodiment of the invention corresponding to the problem of the integration in a display device of the ionizing radiation detection function, the functional elements of the functional film are thin layer semiconductors, whose junction or junctions are reverse biased by virtue of an electrical field applied to the terminals. These semiconductors are preferably silicon with the addition of lithium or of cadmium telluride (CdTe and CdZnTe), or a non-doped area inserted between two contacts with p-i-n doped semiconductors, or a metal-semiconductor-metal junction.

In an embodiment of the invention corresponding to the problem of the integration in a display device of the function for detecting or measuring biometric information, the functional film incorporates thin layers which consist of any material suitable for detecting physical or chemical quantities representative of the biometric information to be detected or measured.

Alternatively, it will be possible to implement an optical function, in which the functional elements will consist of a network of optical microfibers suitable for picking up the image of the fingerprints when a finger is placed on an appliance equipped with this function, such as, for example, a cell phone screen, a car dashboard, a computer, which will make it possible to use the device according to the invention to identify the user and for him or her to physically or logically access devices or information.

In an embodiment of the invention corresponding to the problem of the integration in a display device of the function for creating an electrical current of photovoltaic origin, provision will be made for the functional film to consist of a photovoltaic material.

The invention is not limited by the nature of the pixels of the image, the latter are either backlit by a rear lighting device, or light-emitting, or suitable for reflecting the incident light.

Nor is the invention limited by the form or the configuration of the lenses, when lenses are implemented. The latter may be convergent or divergent, symmetrical or asymmetrical, spherical or aspherical, made of mineral glass or of organic glass. The lenses may be replaced by prisms.

In an advantageous embodiment of the invention, provision is made to simultaneously integrate a plurality of electronic and/or mechanical functions in the display device. The thin layers of the functional film corresponding to the different functions are then either arranged alongside one another, or cover one another or partially overlap, without however covering the areas of transparency.

The invention also provides for the display device to be able to comprise means for displaying a list of available functions, and a command for a user to select a single function from the list, or several functions simultaneously from the list. In this case it is sensible for the function selection command to use the touch function of the screen.

Whatever the variant embodiment implemented by the display device, the information picked up or transmitted by the functional elements is either transmitted to the user of the display device via a message displayed on the screen and/or by the emission of audible or electromagnetic information, or else stored in an electronic memory.

Another subject of the invention is any appliance or electronic device provided with a display device according to any one of the variants described above.

DETAILED DESCRIPTION OF THE INVENTION

The invention is now described in more detail with the help of the description of the indexed FIGS. 1 to 6, in which.

The display device (1) according to the invention consists on the one hand of a display screen (3) whose pixels (7) are either lit by the ambient light, or backlit by a rear lighting device (2), or light-emitting.

Figure 1:
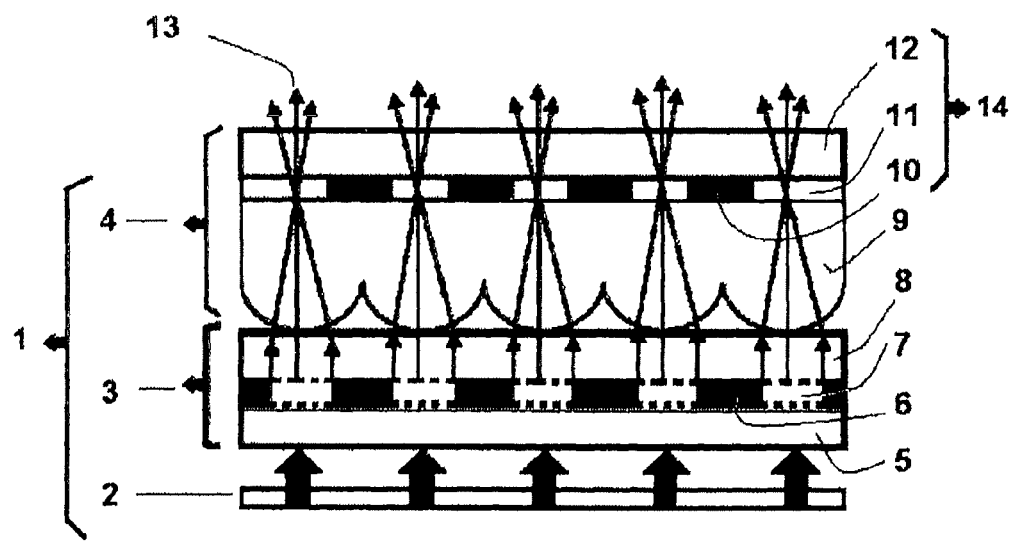
FIG. 1 is a cross-sectional diagram of a display device implementing the optical principle of the invention.
Figure 2:
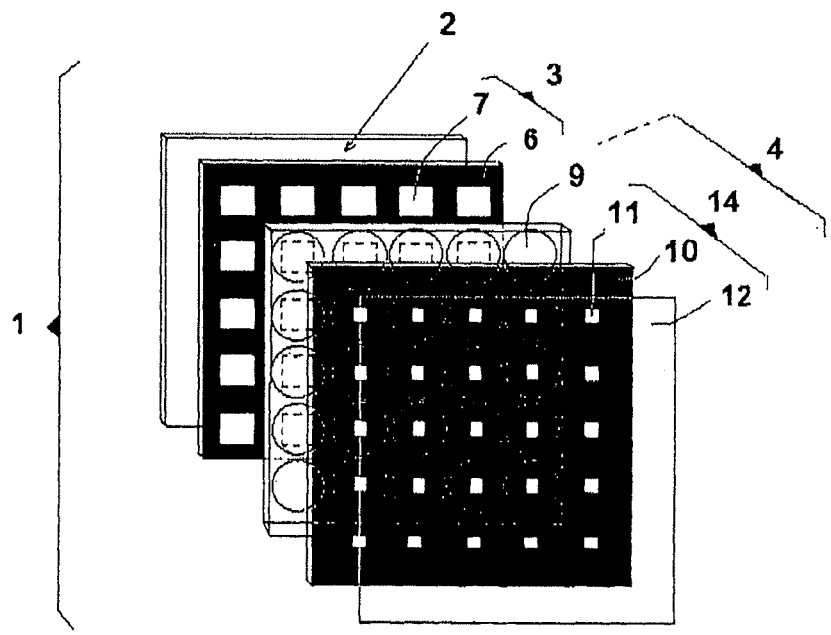
FIG. 2 is a perspective illustration of the different layers that make up the device according to the invention.
Figure 3:
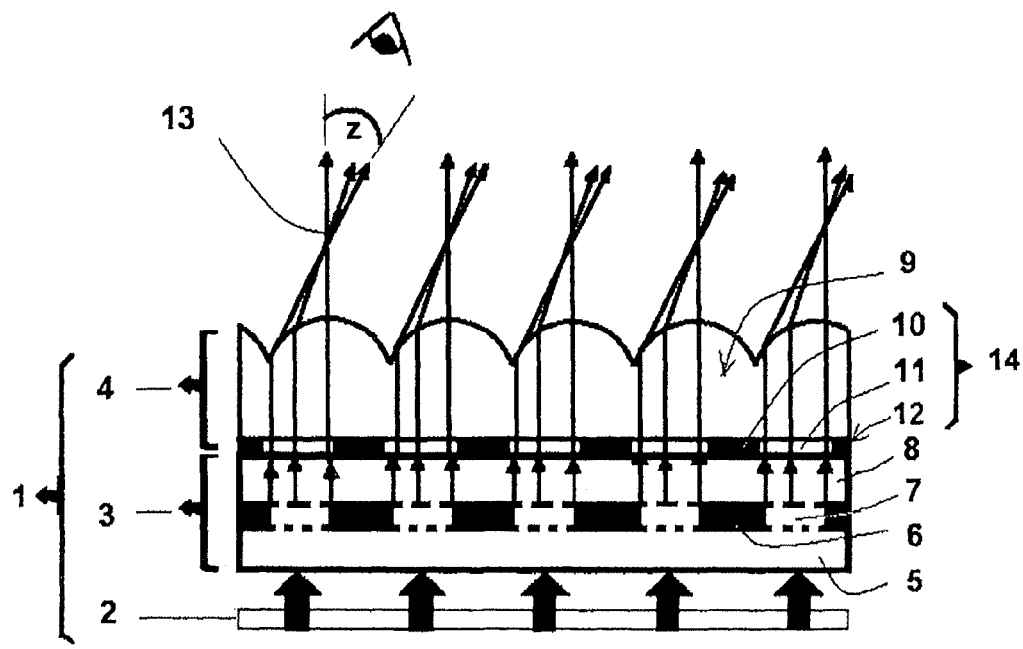
FIG. 3 is a cross-sectional diagram of an optical variant of the display device according to the invention.

FIGS. 1, 2 and 3 illustrate the case of an image backlit by a rear lighting device (2). In this case, the image is either on paper or transparent polymer or liquid crystals (LCD). In the case of the liquid crystals (LCD), the pixels (7) are separated from one another by spaces (6) necessary to the entry of the electrical commands. The pixels of the image are encapsulated between two protective transparent plates or films (5 and 8). The display device (1) according to the invention consists on the other hand of an optical plate (4) arranged or glued on the surface of the screen (3). This plate is ideally formed by the stacking of at least two films (9 and 12).

The first film (9) consists, for example, of a network of lenses, convergent or divergent, symmetrical or asymmetrical, spherical or aspherical, made of mineral glass or of organic glass. These lenses have dimensions close to those of the pixels (7) and are arranged facing each pixel (7) or facing each group of pixels so that the beam of light (13) emitted by the pixel(s) (7) passes through the lens and becomes convergent.

It should be noted that the lenses and the lenticular film (9) may be replaced by prisms and a prismatic film, without departing from the framework of the invention. In order to simplify the explanation, reference will be made hereinbelow in the description to a lenticular film, without this implying any limitation on the scope of the invention.

The second film (12) which makes up the optical plate (4) consists of a transparent material, made of mineral glass or of organic glass, on which has been deposited, or glued, or etched, a thin layer having areas of functional elements (10) and areas of transparency (11), such that this thin layer does not conceal all of the film (12) but leaves areas of transparency (11) which are positioned facing each lens.

The term "thin layer" here defines any material that can be passed through by an electrical current and whose thickness is less than its other dimensions. The function of the thin layer will depend on the material used and will, depending on the case, be able to be an electronic function, even a mechanical function, as explained in the examples cited below. The areas of transparency (11) and the functional elements (10) may be of any form but preferably form a network of geometrical figures.

In order to protect the functional elements (10) from the air, they are positioned on the face of a second film (12), which is a transparent protective film facing the lenticular film (9).

The assembly formed by the layer formed by the alternation of functional elements (10) and areas of transparency, and the protective film (12), will, for convenience, be called the "functional film", in as much as it essentially contains the functional elements (10), and will be identified by the index (14).

The lenticular film (9) and the functional film (14) are preferably glued together with a transparent glue. They are chosen to be rigid or flexible depending on the usage requirements of the display device (1).

The optical plate (4) consisting of the two glued films (9 and 14) may, in a first arrangement (FIG. 1), have its lenticular film (9) placed between the display screen (3) and the functional film (14), or, in a second arrangement (FIG. 3), have its functional film (14) placed between the display screen (3) and the lenticular film (9).

In the case of the first arrangement (FIG. 1), the three main components of the device (1): screen (3), lenticular film (9) and functional film (14), are such that the light emitted by each pixel (7) of the image is deflected through a lens of the lenticular film (9) then converges toward the areas of transparency (11) of the functional film (14) which is on the surface.

Thus, most of the light emitted by the pixels exits from the display device (1), although a significant portion of its surface is covered by a functional film (14) containing non-transparent functional elements (10), these functional elements (10) then remaining invisible to the observer when the brightness of the image is high, because of the high contrast between the light passing through the areas of transparency (11) and the weak brightness of the areas incorporating the functional elements.

In the case of the second arrangement (FIG. 3), the three main components of the device (1): screen (3), lenticular film (9) and functional film (14), are such that the light emitted by each pixel (7) of the image passes first through the areas of transparency (11) of the functional film (14), then is deflected by a lens of the lenticular film (9). The observer will then see the image only if his or her eye intercepts the outgoing rays (13) whose output angles (z) are only between 0° and Z° relative perpendicular to the optical plate (4). For the other positions of the observer, for which the eye is positioned beyond the angular range between 0° and Z°, the observer will see the non-transparent functional elements (10) of the functional film (14).

FIG. 2 is an exploded view of the display device according to the first arrangement described previously (FIG. 1). The screen (3) consists mainly of pixels (7) and of spaces between pixels (6). A backlighting device (2) projects a beam of light through each of the pixels (7). An optical plate (4) covers the screen (3) and consists of two films: a lenticular film (9) and a functional film (14). The functional film (14) contains functional elements (10) which are non-optical and therefore non-transparent, and areas of transparency (11). These areas of transparency (11) are positioned facing the lenses of the lenticular film (9).

In the case of the first arrangement (FIG. 1), as in the case of the second arrangement (FIG. 3), there can be multiple functions of the functional film (14). Two outstanding examples will be described in more detail, namely when the functional elements (10) form a network of touch sensors, and when they form an antenna for emitting/receiving electromagnetic waves, without this in any way detracting from the general nature of the concept of the invention.

Figure 4:
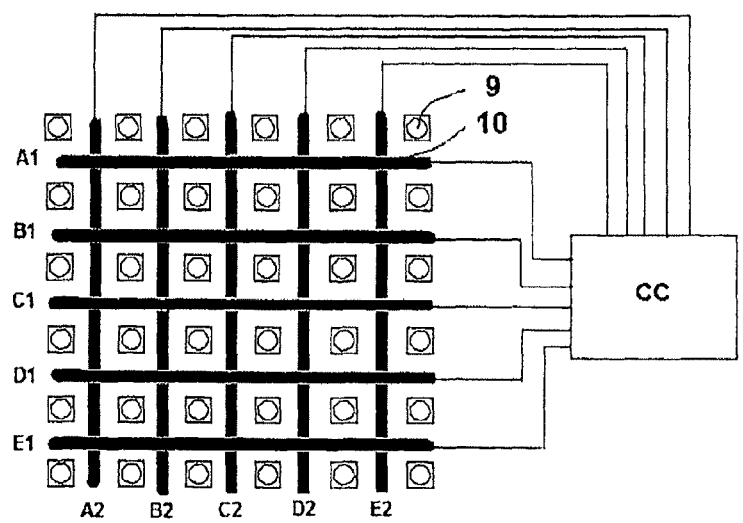
FIG. 4 illustrates a particular form of thin electronic layer with touch function.

FIG. 4 relates to the exemplary embodiment in which the functional film (14) has the touch sensor function.

The functional elements (10) consist of two networks of electrical conductors. Each of the networks consists of conductors in parallel strips and the conductors of the two networks are at right angles to one another. The conductors are of aluminum or of copper or of another electrically conductive metal, which will make it possible to make the screen sensitive to the touch and make it possible to determine the position of a finger on the screen, by a technique known per se. These two networks form a grid which delimits areas of transparency placed in front of the lenses of the lenticular film (9). The conductive strips which therefore make up the functional elements (10) are identified by their X-axis position (A1, B1, C1, D1, E1) on the first network and their Y-axis position (A2, B2, C2, D2, E2) on the second network. Because the two networks are electrically insulated, each intersection of wires forms a capacitive node which is measured by a controller (CC). When a finger approaches or touches one or more intersections of conductors, the changes of capacitance make it possible to compute the position of the finger.

Figure 5:
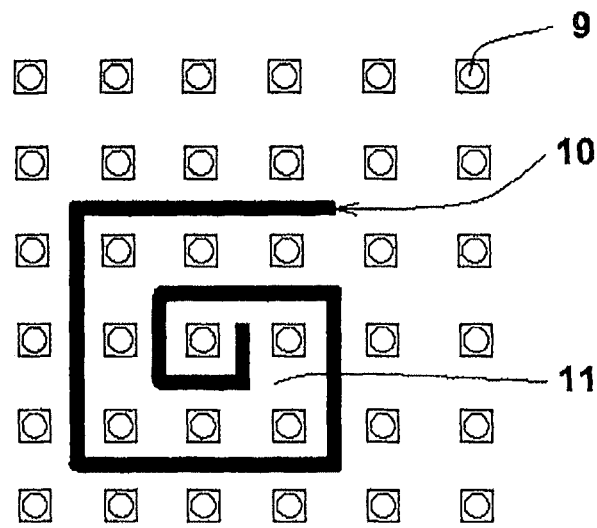
FIG. 5 illustrates a particular form of thin electronic layer with emission/reception antenna functions.

In another particular embodiment (FIG. 5), the functional elements (10) have the function of an antenna for receiving and/or emitting electromagnetic waves. They are configured in the form of a flat electrical conductor, for example made of aluminum, of copper, of silver, of gold or of another electrically conductive material. The form of the antenna is, in this non-restrictive example, a spiral so that it reacts to the radiofrequency identification RFID frequencies. The functional element (10) leaves spaces of transparency (11) placed in front of the lenses of the lenticular film (9). In a manner that is known per se, the antenna (10) is linked to an electronic chip, which is not illustrated, whose function is to manage the information received or emitted by the antenna. The antenna and the electronic chip are powered either by a battery, or by a photovoltaic cell, which are not illustrated, or self-powered by the energy of the radio waves received.

In another particular embodiment, the functional elements (10) have a purely mechanical function of protecting against cuts when the optical plate (4) on the front face of the display is broken. The functional elements (10) may, to this end, consist of wires or strips that are metallic or non-metallic but which resist cuts and which have the property of keeping the pieces of a screen in place when the latter is broken, which prevents the user from being seriously injured in the event of an accident.

Figure 6:
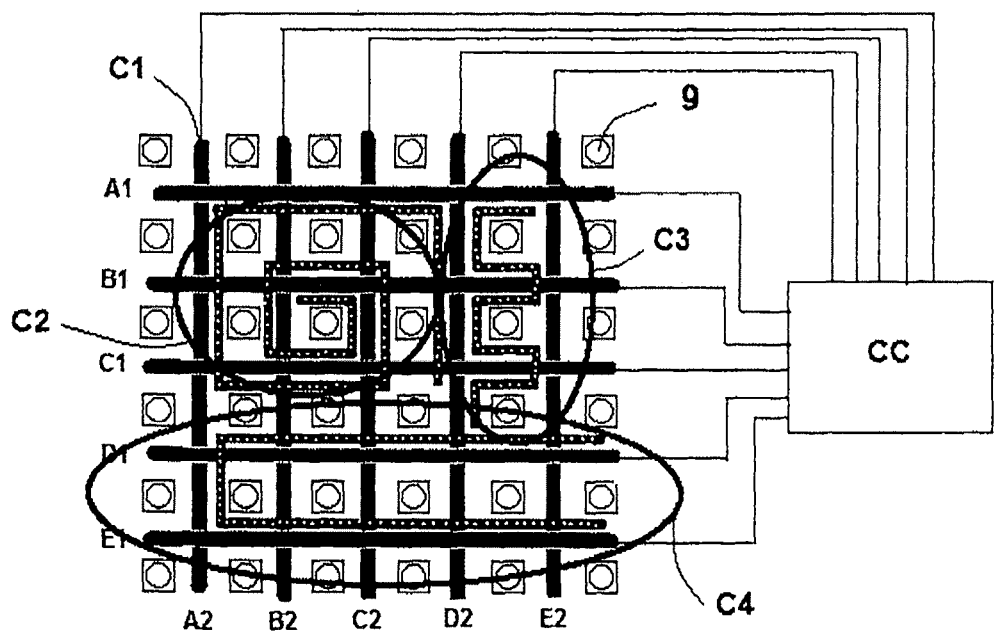
FIG. 6 illustrates a particular form of combinations of a plurality of interweaved thin electronic and/or mechanical layers.

In another particular embodiment, the functional film (14) incorporates diversified functional elements (10), and the film (14) then has several functions. FIG. 6 illustrates a non-restrictive example in which the functional film (14) has four types of functional elements produced in the form of thin layers and identified in FIG. 6 by the areas denoted C1, C2, C3, C4 and whose functions are distinct. In the area C1, the functional elements have a touch recognition function and they consist of a network of capacitive conductors which covers the entire surface of the display device.

The network of capacitive conductors C1 consists of a first network of conductors that are rectilinear and parallel to one another (A1, B1, C1, D1, E1) and of a second network of conductors that are rectilinear and parallel to one another (A2, B2, C2, D2, E2). These two networks are at right angles to one another and form a grid of references X,Y which makes it possible to locate a finger when the latter touches the surface of the device. The processing of the electronic signals generated by the two networks of conductors is managed by an electronic controller (CC).

The functional elements of the area C2 have the RFID antenna function and consist of a flat wire in the form of a spiral which is positioned partly to the side and partly overlapping the conductive grid C1.

The functional elements of the area C3 are produced in the form of a U-shaped temperature sensor in which each branch is parallel to at least one conductor belonging to the functional elements C1 or C2.

The functional elements of the area C4 are produced in the form of a sound vibration sensor consisting of flat piezoelectric components in the form of segments placed end to end. These components partly overlap the conductors of the conductive grid C1 but do not overlap the conductors of the areas C2 and C3.

In all these geometrical configurations, the conductors of the areas C1, C2, C3, C4 do not cover the areas of transparency (11) which are passed through by the light beams outgoing from the pixels and the lenses (9). The enabling of a single function by choice or of several functions by choice and simultaneously may be controlled by an operator who will make a selection from a list of possibilities which will be displayed on the screen, for example the screen of a cell phone. This selection will, for example, be able to be made through the touch screen function. The information picked up by each of the functions will be either transmitted to the operator via a message inscribed on the screen and/or by the emission of audible or electromagnetic information, or else will be stored in an electronic memory for subsequent consultation.

The interfacing of the display device with the other electronic or mechanical components (frame, electronic mother board, etc.), of an electronic appliance incorporating the display device according to the invention, will not be described further, these other components depending on the appliance considered, and being known per se.

Beyond the exemplary embodiments described in conjunction with the figures, the display devices according to the invention may be incorporated in a large number of appliances or media, of which only a few nonlimiting examples will be given:

Integration of the display device in vehicle dashboards (motor vehicle, airplane, train, etc.), notably for the implementation of additional functions such as the touch, voice recognition, presence detection, remote payment (toll road), position and speed detection (GPS) function.

Integration of the display device in helmets with visor (firefighter, cosmonaut, policeman, soldier, etc.): the same functions will be used as for the dashboards, with, in addition, the integration of the radiation detection function.

Integration of the display device in technical clothing (firefighter, policeman, doctor, technician, etc.): as above, with, in addition, the integration of a temperature measurement function.

Integration of the display device according to the invention in urban display panels (town or subway plan, road map, shop window, etc.), mainly with the integration of a touch function.

Integration of the display device in books (for children, tourists, technical books, etc.): it may be useful to integrate a touch function, a light-emitting function, a microphone for audio interaction with the book, as well as a photovoltaic function for the electrical power supply of the book.

Integration of the display device in decorations or furniture: functions of presence detection (intrusion), of electromagnetic protection (Faraday cage), of reception antenna (TV, Internet, etc.), of emission of radio waves tuned to brainwaves for relaxation purposes, will then be implemented.

Integration of the display device in biometric identification appliances.

LIST OF NUMERICAL REFERENCES IN THE FIGURES 1. display device
2. backlighting device
3. screen
4. optical plate
5. protection layer
6. space between pixels
7. pixel
8. protection layer
9. lens/lenticular film
10. functional element
11. area of transparency
12. protection layer
13. light beam emitted by the pixel or pixels
14. functional film incorporating the functional elements 10

ADVANTAGES OF THE INVENTION

Ultimately, the invention meets the aims set. It is particularly suitable for integration on the surface of a device capable of displaying an image, including the surface of electronic display screens, of electronic or mechanical components produced as thin layers, which remain almost or totally invisible to the observer without significantly degrading the quality of the image displayed.

These thin layers are then able to form a wide variety of different functional elements, such as sensors or transducers of information or physical quantities, such as, for example, a touch network of electrical wires, an antenna for emitting and/or receiving electromagnetic waves, a temperature or light or sound wave sensor, but also sensors for sensing the presence of ionizing radiation, of metallic objects or of magnetic fields, or sound or other transducers.

The integration of electronic and/or mechanical components in the display devices according to the invention therefore allows for new means of communication with these display devices or with entities which incorporate them, such as, for example, cell phones, billboards, or even wall or glazed supports.

The invention claimed is:

1. A display device comprising:
   a plurality of pixels forming an image, and
   an optical plate arranged facing the image and including areas of transparency configured to allow at least part of the light from the pixels to pass,
   wherein said optical plate also includes at least one electrical network of functional elements, which are not transparent to the visible light, and which include sensors and/or transducers configured to execute electronic and/or mechanical functions,
   wherein said functional elements are inserted between the areas of transparency and are arranged in such a way that the light emitted by the pixels is directed to pass through the areas of transparency without intercepting the networks of functional elements, so as to render said networks of functional elements invisible or quasi-invisible to an observer of the display device, although they are non-transparent, and
   wherein said electrical network of functional elements includes antenna configured in the form of a flat spiral electrical conductor which leaves a plurality of spaces of transparencies placed in front of a network of lenses also included in the optical plate.

2. The display device as claimed in claim 1, wherein each network of functional is elements is produced in the form of an electronic and/or mechanical functional film whose function is implemented deliberately by the user, or automatically because of the reception of a physical quantity from the medium or because of the emission of a physical quantity to the medium.

3. The display device as claimed in claim 2, wherein the functional film comprises a plurality of areas corresponding to a plurality of functions which are either arranged alongside one another, or cover one another or partially overlap, without covering the areas of transparency.

4. The display device as claimed in claim 1, wherein the network of lenses of the optical plate is produced in the form of a lenticular film positioned between the plane of the pixels and the functional film.

5. The display device as claimed in claim 1, wherein the network of lenses of the optical plate is produced in the form of a lenticular film and wherein the functional film provided with the functional elements is positioned between the pixels and said lenticular film.

6. The display device as claimed in claim 1, wherein said functional elements are non-transparent and spaced apart by areas of transparency arranged facing the lenses, the lenses being positioned between the areas of transparency and the pixels so as to focus the light from one or more pixels toward the areas of transparency and to guide it between functional elements toward the observer of the display device.

7. The display device as claimed in claim 1, wherein said functional elements are non-transparent and spaced apart by areas of transparency arranged facing the lenses, the lenses being positioned above said functional elements so as to guide the light from one or more pixels through the areas of transparency and the lenses and to direct it toward the observer of the display device.

8. The display device as claimed in claim 1, wherein, to produce a contact detection touch function, the functional elements include touch sensors comprising wires that are made of a material that is not transparent to the light and that are electrically conductive.

9. The display device as claimed in claim 8, wherein said electrically conductive wires are insulated from one another and are arranged as a network whose intersections constitute capacitive or resistive nodes suitable for forming a touch network, such that, when a finger or a stylus approaches a node of the network, its position is identified on the display device.

10. The display device as claimed in claim 1, wherein said antenna is configured to emit and/or receive electromagnetic waves and to operate with frequencies which are those of the radiofrequency identification (RFID) devices.

11. The display device as claimed in claim 10, wherein the emitting and/or receiving antenna is either powered by a battery or a photovoltaic cell, or self-powered by the energy of the electromagnetic waves that it receives.

12. The display device as claimed in claim 1, wherein said antenna is configured to emit and/or receive electromagnetic waves operating with electromagnetic frequencies tuned to the operating frequencies of the human brain.

13. The display device as claimed in claim 1, wherein the functional film is a piezoelectric film comprising lead zirconate titanate (LZT).

14. The display device as claimed in claim 1, in which said functional elements are configured to detect metallic objects, wherein the functional film includes inductive sensors with eddy currents comprising a circuit of wires passed through by a sinusoidal voltage.

15. The display device as claimed in claim 1, in which said functional elements are configured to detect ionizing radiation, wherein the functional film includes semiconductors whose junction or junctions are reverse biased by virtue of an electrical field applied to the terminals, said semiconductors being silicon with the addition of lithium or of cadmium telluride (CdTe and CdZnTe), or a non-doped area inserted between two contacts with p-i-n doped semiconductors, or a metal-semiconductor-metal junction.

16. The display device as claimed claim 1, wherein the pixels are either backlit by a rear lighting device, or light-emitting, or suitable for reflecting incident light.

17. The display device as claimed in claim 1, wherein the lenses are convergent or divergent, symmetrical or asymmetrical, spherical or aspherical, made of mineral glass or of organic glass.

18. The display device as claimed in claim 1, wherein the lenses are replaced by prisms.

19. The display device as claimed in claim 1, wherein the device is suitable for displaying on the screen a list of available functions, and wherein it comprises a command for a user to select a single function from the list, or several functions simultaneously from the list.

20. The display device as claimed in claim 19, wherein said function selection command uses the touch function of the screen.

21. The display device as claimed in claim 1, wherein information picked up or transmitted by the functional elements is either transmitted to an operator via a message on the screen and/or transmitted to the operator by the emission of audible or electromagnetic information, or stored in an electronic memory.

22. An appliance, comprising at least one display device as claimed in claim 1.

23. A display device comprising:
a plurality of pixels forming an image, and
an optical plate arranged facing the image and including areas of transparency configured to allow at least part of the light from the pixels to pass,
wherein said optical plate also includes at least one electrical network of functional elements, which are not transparent to the visible light, and which include sensors and/or transducers configured to execute electronic and/or mechanical functions,
wherein said functional elements are inserted between the areas of transparency and are arranged in such a way that the light emitted by the pixels is directed to pass through the areas of transparency without intercepting the networks of functional elements, so as to render said networks of functional elements invisible or quasi-invisible to an observer of the display device, although they are non-transparent, and
wherein said electrical network of functional elements includes a sound vibration sensor consisting of a flat piezo-electric component in a form of segments placed end-to-end, which leaves a plurality of spaces of transparencies placed in front of a network of lenses also included in the optical plate.

24. A display device comprising:
a plurality of pixels forming an image, and
an optical plate arranged facing the image and including areas of transparency configured to allow at least part of the light from the pixels to pass,
wherein said optical plate also includes at least one electrical network of functional elements, which are not transparent to the visible light, and which include sensors and/or transducers configured to execute electronic and/or mechanical functions,
wherein said functional elements are inserted between the areas of transparency and are arranged in such a way that the light emitted by the pixels is directed to pass through the areas of transparency without intercepting the networks of functional elements, so as to render said networks of functional elements invisible or quasi-invisible to an observer of the display device, although they are non-transparent, and
wherein said electrical network of functional elements includes a u-shaped temperature sensor that at least partially surrounds a plurality of spaces of transparencies placed in front of a network of lenses also included in the optical plate.

* * * * *